United States Patent
Ou et al.

(10) Patent No.: US 8,509,189 B2
(45) Date of Patent: Aug. 13, 2013

(54) SYSTEM FOR MANAGING SERVICES OF WIMAX BASE STATIONS

(75) Inventors: Canhui Ou, Danville, CA (US);
Anthony Petronelli, San Jose, CA (US);
Kevin Meng, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 31 days.

(21) Appl. No.: 13/029,437

(22) Filed: Feb. 17, 2011

(65) Prior Publication Data

US 2011/0142010 A1 Jun. 16, 2011

Related U.S. Application Data

(63) Continuation of application No. 11/780,710, filed on Jul. 20, 2007, now Pat. No. 7,916,698.

(51) Int. Cl.
*H04W 48/02* (2009.01)
(52) U.S. Cl.
USPC ........... 370/331; 370/328; 370/329; 370/332; 455/436
(58) Field of Classification Search
USPC ......... 370/328, 331, 332, 333, 329; 455/436, 455/438, 439, 452.1–452.2, 453
See application file for complete search history.

(56) References Cited

U.S. PATENT DOCUMENTS

| | | | |
|---|---|---|---|
| 6,625,132 B1 * | 9/2003 | Boettger et al. | 370/329 |
| 7,848,241 B2 * | 12/2010 | Natarajan et al. | 370/238 |
| 2005/0020309 A1 * | 1/2005 | Moeglein et al. | 455/561 |
| 2007/0254664 A1 * | 11/2007 | Klotsche | 455/436 |
| 2008/0139206 A1 * | 6/2008 | Touray et al. | 455/437 |
| 2012/0178450 A1 * | 7/2012 | Kuru et al. | 455/436 |

* cited by examiner

*Primary Examiner* — Cong Tran
(74) *Attorney, Agent, or Firm* — Guntin & Gust, PLC; Douglas Schnabel

(57) ABSTRACT

A system that incorporates teachings of the present disclosure may include, for example, a base station having a wireless transceiver operable in compliance with a Worldwide Interoperability for Microwave Access protocol, and a controller to manage the wireless transceiver. The controller can be operable to receive a request from a communication device to access the base station, and to direct the communication device to a second base station upon determining that granting wireless access to the communication device reduces an operating performance of the base station below an operating threshold of the base station. Additional embodiments are disclosed.

15 Claims, 3 Drawing Sheets

SYSTEM FOR MANAGING SERVICES OF WIMAX BASE STATIONS

PRIOR APPLICATION

This application is a continuation of U.S. patent application Ser. No. 11/780,710 filed Jul. 20, 2007 by Ou et al., entitled "System for Managing Services of WiMAX Base Stations." All sections of the aforementioned application are incorporated herein by reference.

FIELD OF THE DISCLOSURE

The present disclosure relates generally to communication systems, and more specifically to a system for managing services of Worldwide Interoperability for Microwave Access (WiMAX) base stations.

BACKGROUND

WiMAX communications is a relatively new broadband service which is being deployed in targeted areas where DSL and cable services are more costly to deploy. Typically, WiMAX base stations are deployed in overlapping sectors so as to increase the likelihood that all targeted areas will have broadband wireless coverage.

Generally, a WiMAX transceiver (or modem) located in a building or roaming (e.g., WiMAX-capable laptop computer or cell phone) in a network with overlapping sectors selects a sector based on the radio frequency (RF) signal quality and signal strength it detects from said sectors. Sometimes a sector having better signal quality than others tends to be overloaded with WiMAX transceivers.

This situation can substantially reduce the efficiency in bandwidth utilization of the overloaded WiMAX base station. Consequently, fixed and mobile WiMAX transceivers operating in the overloaded sector may experience a transmission throughput and signal quality level below a desired threshold set forth by a service operator of said system.

DETAILED DESCRIPTION

In one embodiment of the present disclosure, a non-transitory computer-readable storage medium has computer instructions to receive a request from a communication device for wireless access to a first base station selected from a plurality of base stations operating according to a Worldwide Interoperability for Microwave Access (WiMAX) protocol, to determine whether the communication device can access a second one of the plurality of WiMAX base stations to balance usage of communication resources of at least one of the plurality of WiMAX base stations, and to direct the communication device to the second WiMAX base station responsive to determining that the communication device can access said second WiMAX base station.

In one embodiment of the present disclosure, a base station having a wireless transceiver operable in compliance with a Worldwide Interoperability for Microwave Access protocol, and a controller to manage the wireless transceiver. The controller can be operable to receive a request from a communication device to access the base station, and to direct the communication device to a second base station upon determining that granting wireless access to the communication device reduces an operating performance of the base station below an operating threshold of the base station.

In one embodiment of the present disclosure, a communication device having a memory, and a controller coupled to the memory. The controller can be operable to submit a request for wireless access to a WiMAX base station, and to receive from the WiMAX base station a grant to the request for wireless services responsive to the WiMAX base station determining that a reduced operating performance of the WiMAX base station resulting from granting wireless access to the communication device is above an operating threshold of the WiMAX base station.

Figure 1:
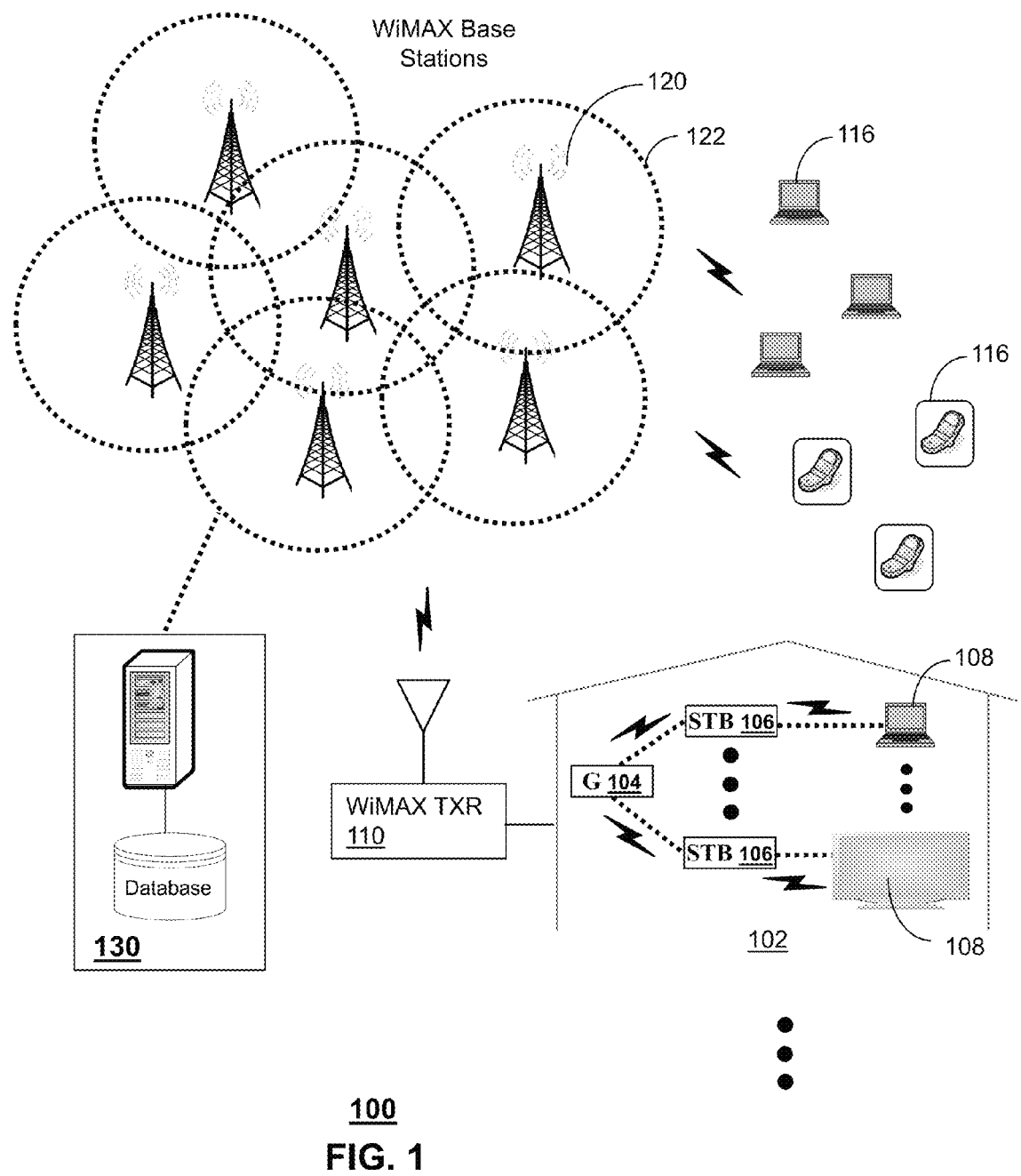
FIG. 1 depicts an exemplary block diagram of a communication system.

FIG. 1 depicts an exemplary block diagram of a communication system 100. The communication system 100 comprises a plurality of WiMAX base stations 120 positioned in overlapping wireless sectors 122 to increase the likelihood that all targeted areas will have broadband wireless coverage. A controller 130 utilizing common computing and communications technologies (e.g., a server with Internet connection) can be used to manage operations of the plurality of WiMAX base stations 120. Each of the WiMAX base stations 120 can utilize common computing technology such as a computer or server and a wireless transceiver coupled to a an antenna tower to supply WiMAX broadband services to fixed and roaming WiMAX transceivers 110, 116.

Fixed WiMAX transceivers 110 can be located in a building 102 for purposes of providing data (e.g., high speed Internet), voice (e.g., Voice over IP), and/or video (e.g., IPTV) services to a number of presentation devices 108 situated therein such as television units and/or computers by way of a gateway 104 coupled to one or more set-top boxes (STBs) 106. The presentation devices 108 can access broadband services of a WiMAX station 120 by wired (e.g., cable) and/or wireless (e.g., WiFi) means in said building 102. Roaming WiMAX transceivers 116 can be represented by portable laptops or cell phones with communications capability of establishing communications with a WiMAX base station 120.

Figure 2:
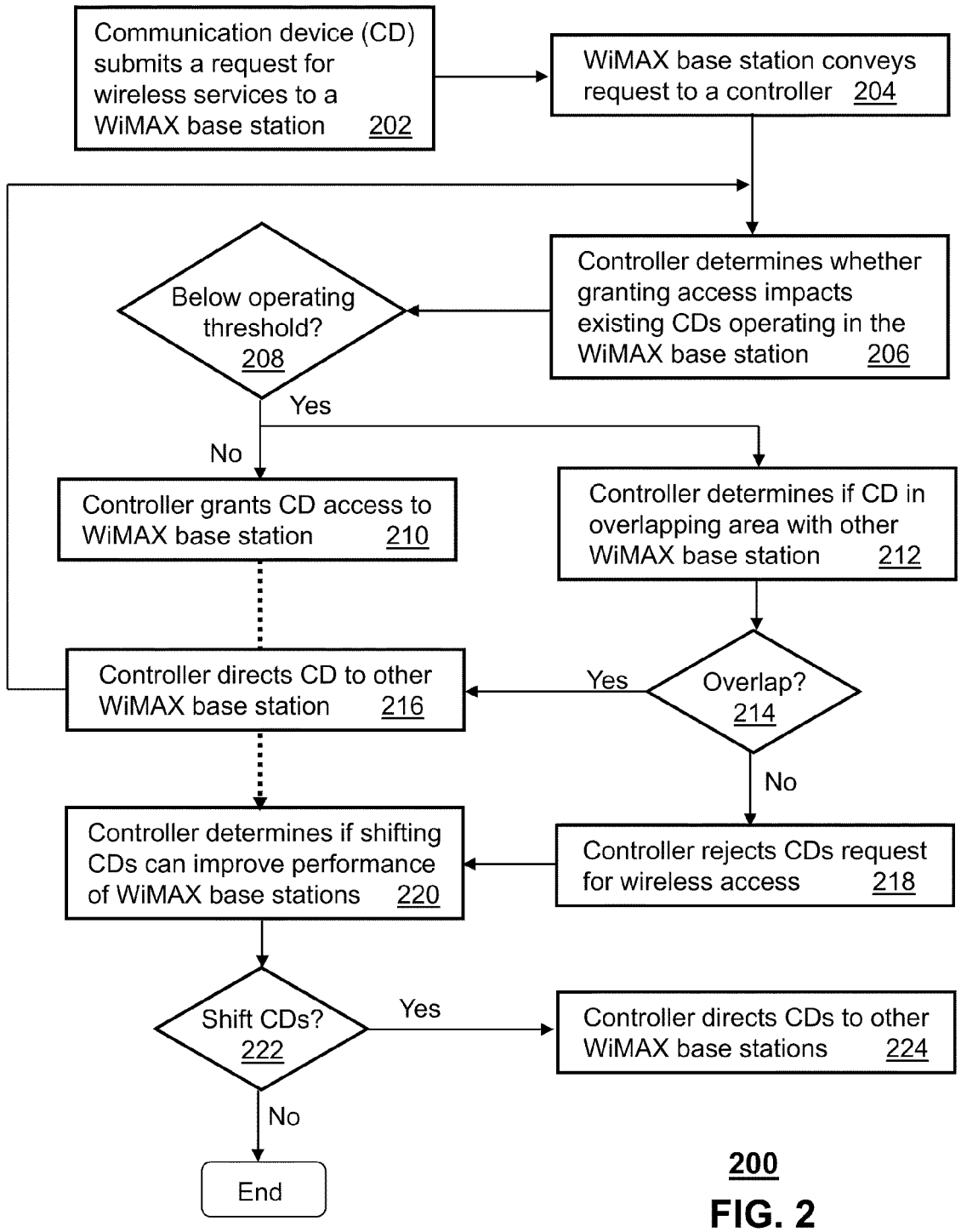
FIG. 2 depicts an exemplary method operating in portions of the communication system.

FIG. 2 depicts an exemplary method 200 operating in portions of the communication system 100. Method 200 begins with step 202 in which a communication device 110 or 116 submits a request for wireless services to a WiMAX base station 120. The WiMAX base station 120 conveys the request to the controller 130 in step 204. In step 206, the controller 130 determines whether granting access to the communication device 110 or 116 will have an operational impact on existing communication devices operating in the wireless sector 122 of the WiMAX base station 120 requested.

This step can be determined a number of ways. For example, the controller 130 can determine an impact to an operational performance of the WiMAX base station 120 according to a change in a communication throughput of a group of communication devices 110 or 116 operating in the wireless sector 122 managed by said WiMAX base station. For example, the controller 130 can determine that adding the communication device 110 or 116 to the requested WiMAX base station 120 can in a worst case scenario drop the throughput of a communication device already operating the network from 20 Mbps to 19 Mbps. The drop in throughput may or may not be acceptable to support the existing services supplied to said existing communication device.

The controller 130 can also determine by common means a radio frequency (RF) modulating level of wireless signals transmitted by the communication device 110 or 116 making the request, a bandwidth capacity of said WiMAX base station, the number of communication devices operating in the wireless sector of said WiMAX base station, and/or an RF modulation level of each of the communication devices operating in said wireless sector. With all or a portion of these metrics, the controller 130 can determine the operational impact to the WiMAX base station 120 in question.

In step 208, any of these results can be compared to an operating threshold established for the WiMAX base station 120 being requested. The operating threshold can correspond to a Quality of Service (QoS) threshold, and/or one or more operating metrics identified in a Service Level Agreement (SLA). For example, high definition (HD) TV programming or VoIP service can have QoS requirements respectively for bandwidth, jitter, packet loss and other performance factors. To accommodate the QoS requirements for one or more HDTV and/or VoIP channels a subscriber of said services can be guaranteed according to an SLA agreed to by the service provider a particular throughput and signal quality. The operating threshold can therefore be used by a service provider to test that the operating performance of the WiMAX base station 120 does not violate a QoS or SLA requirement established for subscribers with communication devices 110 or 116 operating in the wireless sector 122 of said WiMAX base station.

If granting wireless services to the requesting communication device 110 or 116 does not violate said threshold, the controller 130 proceeds to step 210 where it directs the WiMAX transceiver 120 to grant said communication device the wireless services requested. If on the other hand the controller 130 determines that the reduction in operating performance of the WiMAX base station 120 falls below its operating threshold, the controller 130 proceeds to step 212 where it determines if the communication device 110 or 116 is located in an overlapping wireless sector 122 thereby providing it access to another WiMAX base station. This can be determined by querying other WiMAX base stations 120 as to whether they detect wireless signals from the communication device 110 or 116. If there is no overlap, the controller 130 directs the WiMAX base station 120 to reject in step 218 the communication device's request for wireless access.

Otherwise, the controller 130 proceeds to step 216 where it instructs in step 216 the WiMAX base station 120 to direct the communication device 110 or 116 to seek wireless services at another WiMAX base station within its reach. In cases were the communication device 110 or 116 can access more than one other WiMAX base station 120, the controller 130 selects the WiMAX base station most likely to provide the communication device the services it is requesting. Once the communication device 110 or 116 transitions to the other WiMAX base station 120 identified by the controller 130, steps 206 through 216 in whole or in part are repeated until the communication device exhausts its options or locates a WiMAX base station from which it can operate without adversely affecting other communication devices.

From either step 216 or 218 the controller 130 can be programmed to determine in step 220 whether proactively shifting one or more communication devices 110 or 116 already operating in one of the WiMAX base stations 120 to other WiMAX base stations 120 can improve the performance of at least a portion of the plurality of WiMAX base stations collectively. The controller 130 can perform this step by tracking the operating performance of each WiMAX base station 120 and determining whether opportunities exist to balance the communication load between WiMAX base stations in the communication system 100. If no opportunities are detected, method 200 ends and repeats itself when another communication device 110 or 116 seeks services from a select WiMAX base station 120.

If a transition opportunity is detected in step 222 in which one or more communication devices 110 or 116 can be shifted without substantially impacting services already supplied to said communication devices and to the WiMAX base stations 120 to which they are to be relocated, the controller 130 proceeds to step 224 where it directs said one or more communication devices 110 or 116 by way of the WiMAX base stations from where they currently operate to transition to other WiMAX base stations 120 identified by the controller. In this transition, the communication devices 110 or 116 can be guaranteed service at the other WiMAX base stations 120. Moreover, the transition can be performed during off-hours or low traffic conditions to avoid impacting wireless services supplied to subscribers of said one or more communication devices 110 or 116.

From the foregoing descriptions, it would be evident to an artisan with ordinary skill in the art that the aforementioned embodiments can be modified, reduced, or enhanced without departing from the scope and spirit of the claims described below. For example, each or the WiMAX base stations 120 can be assigned their own operating threshold or one uniform threshold can be applied to all WiMAX base stations. In another embodiment, steps 220 through 224 can be performed as a periodic background process that takes place independently from the communication establishment procedure of steps 202 through 218. In yet another embodiment, the controller 130 can be an integral part of each WiMAX base station 120. In this embodiment, the WiMAX base stations 120 can be programmed by way of their respective controllers to share between base stations information associated with communication devices 110 or 116 operating in their sector and decide collectively how to manage the distribution of communication devices amongst their sectors 122.

These are but a few examples of how the embodiments described herein can be updated without altering the scope of the claims below. Accordingly, the reader is directed to the claims for a fuller understanding of the breadth and scope of the present disclosure.

Figure 3:
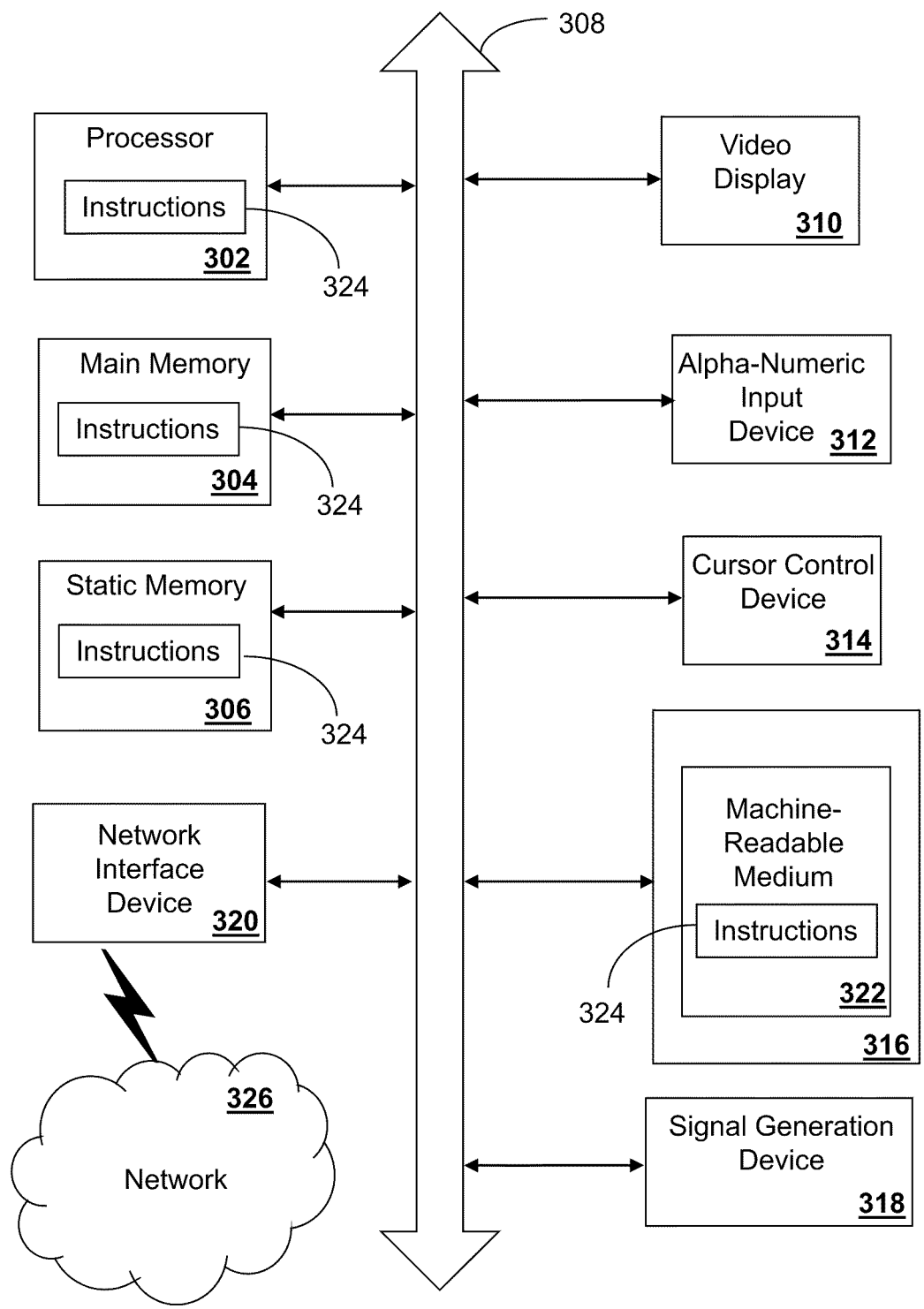
FIG. 3 is a diagrammatic representation of a machine in the form of a computer system within which a set of instructions, when executed, may cause the machine to perform any one or more of the methodologies discussed herein.

FIG. 3 depicts an exemplary diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a mass storage medium 316, a signal generation device 318 (e.g., a speaker or remote control) and a network interface device 320.

The mass storage medium 316 may include a computer-readable storage medium 322 on which is stored one or more sets of instructions (e.g., software 324) embodying any one or more of the methodologies or functions described herein, including those methods illustrated above. The computer-readable storage medium 322 can be an electromechanical medium such as a common disk drive, or a mass storage medium with no moving parts such as Flash or like non-volatile memories. The instructions 324 may also reside, completely or at least partially, within the main memory 304, the static memory 306, and/or within the processor 302 during execution thereof by the computer system 300. The main memory 304 and the processor 302 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the computer-readable storage medium 322 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions which, when executed by a processor, cause the processor to perform operations comprising:
    receiving a request from a communication device for wireless access to a first base station selected from a plurality of base stations operable in compliance with a worldwide interoperability for microwave access protocol;
    determining an impact to an operating performance of the first base station by the wireless access according to a modulation level of wireless signals transmitted by the communication device;
    determining whether the wireless access can be handled by a second base station of the plurality of base stations, responsive to determining the impact to the operating performance of the first base station;
    determining whether handling the wireless access by the second base station will reduce a second operating performance of the second base station below a second operating threshold; and
    declining to grant the wireless access by the communication device to any base station of the plurality of base stations responsive to determining that handling the wireless access by the second base station will lower the second operating performance below the second operating threshold.

2. The non-transitory storage medium of claim 1, comprising computer instructions which, when executed by the processor, cause the processor to perform operations comprising handling the wireless access by the second base station responsive to determining that handling the wireless access by the second base station will not reduce the second operating performance of the second base station below the second operating threshold.

3. The non-transitory storage medium of claim 1, comprising computer instructions wherein the declining to grant the wireless access to any base station of the plurality of base stations is further conditional on determining that no other base station of the plurality of base stations is accessible to the communication device.

4. The non-transitory storage medium of claim 1, comprising computer instructions which, when executed by the processor, cause the processor to perform operations comprising granting the wireless access to the first base station responsive to determining that a first operating performance of the first base station resulting from granting the wireless access to the first base station is above a first operating threshold.

5. The non-transitory storage medium of claim 1, comprising computer instructions which, when executed by the processor, cause the processor to perform operations comprising declining the wireless access to any of the plurality of base stations responsive to determining that providing the communication device with wireless access to the first base station reduces a first operating performance of the first base station below a first operating threshold and determining that no other base station of the plurality of base stations is accessible to the communication device.

6. The non-transitory storage medium of claim 5, wherein the first operating threshold corresponds to one among a Quality of Service threshold and an operating metric identified in a Service Level Agreement.

7. The non-transitory storage medium of claim 1, comprising computer instructions which, when executed by the processor, cause the processor to perform operations comprising determining an operational impact to an operating performance of the first base station according to a change in a communication throughput of a group of communication devices utilizing communication services of the first base station.

8. The non-transitory storage medium of claim 1, comprising computer instructions which, when executed by the processor, cause the processor to perform operations comprising directing a communication device utilizing communication services of a corresponding one of the plurality of base stations to switch to another base station to increase an operating performance of one of the plurality of base stations.

9. The non-transitory storage medium of claim 1, comprising computer instructions which, when executed by the processor, cause the processor to perform operations comprising determining an impact to an operating performance of the first base station according to one of a bandwidth capacity of the first base station, a number of communication devices operating in a wireless sector of the first base station, a radio frequency modulation level of each of the communication devices operating in the wireless sector, and a combination thereof.

10. The non-transitory storage medium of claim 1, comprising computer instructions which, when executed by the processor, cause the processor to perform operations comprising increasing an operating performance of one of the plurality of base stations by transitioning communication device utilizing communication services of the one of the plurality of base stations to another base station.

11. A base station, comprising:
    a wireless transceiver operable in compliance with a worldwide interoperability for microwave access protocol;
    a memory to store computer instructions; and
    a processor coupled to the memory and the wireless transceiver, wherein the processor, responsive to executing the computer instructions, performs operations comprising:
        receiving a request from a communication device to access the base station;
        determining whether the access by the communication device reduces an operating performance of the base station below an operating threshold that corresponds to one of a quality of service threshold and an operating metric identified in a service level agreement; and
        declining to grant the access by the communication device to any base station of a plurality of base stations operable for wireless communications by the worldwide interoperability for microwave access protocol responsive to determining that granting the access to the communication device reduces the operating performance of the base station below the operating threshold of the base station.

12. The base station of claim 11, wherein the processor, responsive to executing the computer instructions, performs operations comprising granting the access upon determining that the operating performance of the base station is above the operating threshold.

13. The base station of claim 11, wherein the processor, responsive to executing the computer instructions, performs operations comprising declining the access to the base station responsive determining that granting access to the communication device to a second base station of the plurality of base stations will reduce a second operation performance of the second base station to a level below an operating threshold of the second base station.

14. The base station of claim 11, wherein the processor, responsive to executing the computer instructions, performs operations comprising determining an impact to the operating performance of the base station of granting the access to the communication device according to one of a bandwidth capacity of the base station, a number of communication devices operating in a wireless sector of the base station, a radio frequency modulation level of each of the communication devices operating in the wireless sector, and a combination thereof.

15. A method, comprising:
    determining, by a system comprising a processor, whether a request for wireless access to a base station by a communication device will reduce an operating performance of the base station below an operating threshold that corresponds to one of a quality of service threshold and an operating metric identified in a service level agreement, wherein the base station is operable for wireless communications according to worldwide interoperability for microwave access protocol; and
    declining, by the system, to grant the wireless access by the communication device to any base station of a plurality of base stations operable for wireless communications according to the worldwide interoperability for microwave access protocol responsive to determining that granting the wireless access reduces an operating performance of the base station below an operating threshold of the base station.

* * * * *